United States Patent
Bissinger

[11] 3,882,145
[45] May 6, 1975

[54] HALOGENATED N-SUBSTITUTED THIOCARBOXY MALEIMIDES

[75] Inventor: William E. Bissinger, Akron, Ohio

[73] Assignee: PPG Industries, Inc., Pittsburgh, Pa.

[22] Filed: Dec. 22, 1972

[21] Appl. No.: 317,571

[52] U.S. Cl. .................. 260/326.4; 71/95; 424/274
[51] Int. Cl. .............................................. C07d 27/18
[58] Field of Search ................................ 260/326.4

[56] References Cited
UNITED STATES PATENTS
3,340,263    9/1967    Staehelin et al. ............ 260/326.5 X

*Primary Examiner*—Joseph A. Narcavage
*Attorney, Agent, or Firm*—Mark Levin

[57] ABSTRACT

Disclosed are 2,3-dihalo and 2-halo-N-substituted thiocarboxy maleimides of the formula

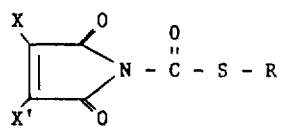

In the above formula, X is halogen; X' is halogen or H; and R is an organic radical containing up to about 12 carbon atoms. The compounds of the present invention possess postemergent herbicidal activity and many of the compounds possess viricidal activity.

5 Claims, No Drawings

HALOGENATED N-SUBSTITUTED THIOCARBOXY MALEIMIDES

The present invention relates to halogenated N-substituted thiocarboxy maleimides of the formula:

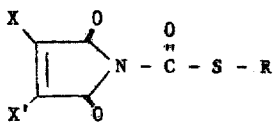

wherein X is halogen, i.e., fluorine, chlorine, bromine, or iodine; X' is halogen or H; and R is an organic radical containing from 1 to about 12 carbon atoms. Typically R will contain from 1 to 10 carbon atoms and preferably will contain from 1 to 6 carbon atoms.

In the above formula, R may be straight or branched chain aliphatic such as straight or branched chain alkane, straight or branched chain alkene or straight or branched chain haloalkane or haloalkene. The R moiety may also be cycloaliphatic such as cycloalkane, cycloalkene, cyclohaloalkane, or cyclohaloalkene. In addition, R may be an aromatic moiety of from 6 to about 12 carbon atoms; for example R may be phenyl, alkyl-substituted phenyl, alkoxy-substituted phenyl, or halogen-substituted phenyl.

In a preferred embodiment of the present invention, X and X' are chlorine and R is an aliphatic group containing from 1 to about 6 carbon atoms. Examples of R groups of the preferred embodiment are methyl, 2-chloro-ethyl, isopropyl, 2,3-dibromo butyl, isopentyl, and 2-chloro-3-hexenyl.

Compounds within the scope of the present invention are:

2,3-diiodo-N-isobutylthiocarboxy maleimide
2,3-diiodo-N-heptenylthiocarboxy maleimide
2-iodo-N-nonylthiocarboxy maleimide
2,3-dichloro-N-isopropylthiocarboxy maleimide
2,3-dichloro-N-allylthiocarboxy maleimide
2,3-dichloro-N-2,3-dibromopropylthiocarboxy maleimide
2,3-dichloro-N-3-methoxyphenylthiocarboxy maleimide
2,3-dichloro-N-2-chloroallylthiocarboxy maleimide
2,3-dichloro-N-cyclopentylthiocarboxy maleimide
2-chloro-N-isopropylthiocarboxy maleimide
2-chloro-N-dodecylthiocarboxy maleimide
2-chloro-N-3,4-dichlorohexylthiocarboxy maleimide
2-chloro-N-2-chlorophenylthiocarboxy maleimide
2-chloro-N-cyclohexylthiocarboxy maleimide
2,3-dibromo-N-propylthiocarboxy maleimide
2,3-dibromo-N-2-hexenylthiocarboxy maleimide
2,3-dibromo-N-octylthiocarboxy maleimide
2-bromo-N-2,3-dichlorophenylthiocarboxy maleimide
2-bromo-N-isopropylthiocarboxy maleimide
2,3-difluoro-N-pentylthiocarboxy maleimide
2,3-difluoro-N-allylthiocarboxy maleimide
2,3-difluoro-N-2,3-dichlorophenylthiocarboxy maleimide
2-fluoro-N-2-N-2-fluoroallylthiocarboxy maleimide
2-fluoro-N-2,3,4-trimethylphenylthiocarboxy maleimide The compounds of the instant invention are prepared by reacting a halogenated maleimide of the formula

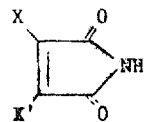

where X is halogen, and X' is halogen or H with a chloro thioformate of the formula

where R is an organic radical having from 1 to about 12 carbon atoms.

The halogenated maleimides necessary for preparation of the desired compound can be prepared by known methods. For example, 2-fluoromaleimide can be prepared by the reaction of 2-chloromaleimide with potassium fluoride in dimethyl formamide (see *J. Am. Chem. Soc.*, 78, 6034 (1956) and 81, 2674 (1959)). The difluoro compound, 2,3-difluoromaleimide, may be prepared by the reaction of 2,3-dichloromaleimide with potassium fluoride in dimethyl formamide. The monochloro compound, 2-chloromaleimide, is obtained along with 2,3-dichloromaleimide by the chlorination of succinimide (G. L. Ciamician and P. Silber, Chem. Ber. 16, 2394 (1883)). It is also reported to be obtained by the reaction of chloromaleic anhydride with ammonia over alumina (British Pat. No. 1,116,125). The bromo-chloro compound, 2-bromo-3-chloromaleimide, may be prepared by the treatment of 2,3,5-trichloropyrrole with 1.5 moles of bromine in acetic acid or by the oxidation of 2,4,5-trichloro-3-bromopyrrole with nitric acid as reported in Beilstein, 21, 404 and by Mazzara and Borgo in Gazz. Chim. Ital. 34 II, 125, 181 (1904). The monobromo compound, 2-bromomaleimide may be prepared by the bromination of succinimide as reported by K. Loscher and R. Kusserow in Chem. Ber. 21, 2718 (1888). The dibromo compound, 2,3-dibromomaleimide, is also prepared by the reaction of bromine with succinimide as reported by G. L. Ciaimician and P. Silber in Chem. Ber. 17, 553 (1884). It is reported by A. P. Terentjew and W. W. Tschelinzew in Chem. Ber. 58B, 66 (1925) that 2,3-diiodomaleimide is prepared by the nitric acid oxidation of diiodo-α-acetylpyrrole.

The reaction between the halogenated maleimide and chlorothioformate may be carried out in a liquid medium provided by an organic solvent which is inert to the reactants and products and in which is dissolved an acid acceptor. Preferred solvents include benzene, ethyl ether, dioxane, toluene, xylene, carbon tetrachloride, and chloroform. Acid acceptors which may be employed include triethylamine, pyridine, and N,N-dimethyl aniline.

The reaction temperature may range from the freezing point to the boiling point of the system. In general, a reaction temperature of from −20° to 100°C. is desirable, with a temperature of from 0° to 80°C. being preferred.

The following examples illustrate how the present invention may be practiced.

EXAMPLE I 2,3-dichloromaleimide was prepared by the photochlorination of succinimide as represented by the following equation:

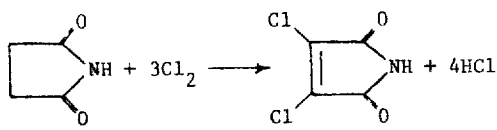

The reaction was carried out in a 1,000-milliliter, 3-necked, round-bottomed flask equipped with two $Cl_2$ cylinders in parallel attached to a gas inlet tube with one cylinder operating at a time. On the exit side of the reaction flask was attached a thermometer, $H_2SO_4$ bubbler (for judging gas flow), a glass wool filled dropout trap, an HCl scrubber through which water was slowly dropped, and an Erlenmeyer collection flask under the scrubber whose contents were periodically titrated for HCl by-product. The reaction flask contents were stirred by a motor-driven Teflon paddle and heated by two 275-watt sunlamps which provided catalytic radiation.

The reaction flask was charged with 300 grams (3.03 moles) of succinimide after having been purged with purified nitrogen the preceding day. The flask was heated to 128°C. with a heating mantle to melt the succinimide which had a melting point of 125°C. Subsequent heating was accomplished solely by the sunlamps. At 135°C. chlorine addition to the light tan melt was started with the melt changing to a "honey" yellow color shortly thereafter. The average chlorine addition rate during the 22.5-hour run was 53 grams per hour. The temperature was maintained at 140°C. during the first 16 hours and at 165°C. thereafter. After 22.5 hours the temperature suddenly decreased to 150°C. for no apparent reason, with the reaction mixture color becoming a deep red. Upon a continuing temperature decrease, the reaction was terminated after an additional 5 minutes. Total weight of chlorine used during the reaction was 1202 grams by cylinder weight difference. Total weight of crude product, which contained some dissolved $Cl_2$ gas, was 455.5 grams. The crude product was broken down into four fractions which were purified as follows:

Part A — Seventy-five grams of crude product which had been deposited on the upper flask walls were recrystallized from 75 milliliters of hot absolute ethanol, yielding 47 grams of light yellow crystals having a melting point of from 175° to 178°C. These crystals were then recrystallized from 53 grams of 95 per cent ethanol, yielding 36.4 grams (36.4/75 = 48.5 percent recovery) of white crystals having a melting point of from 178° to 180°C.

Part B — A portion of the crude product from the bottom portion of the reactor flask was sublimed in a 1,000-milliliter Erlenmeyer flask, yielding 47 grams of a light yellow product. This material was recrystallized from 30 milliliters of absolute ethanol, yielding 27.2 grams of light yellow crystals having a melting point of 173° to 176°C. These crystals were next recrystallized from 39 grams of 95 per cent ethanol, yielding 22.5 grams (22.5/47 = 47.8 percent recovery) of white crystals having a melting point of 178° to 180°C.

Part C — Two hundred five grams of crude product from the reactor flask were recrystallized from 118 milliliters of absolute ethanol, yielding 118 grams of medium yellow crystals having a melting point of 174° to 177°C. These crystals were then recrystallized from 81.5 grams of ethanol, yielding 70.3 grams (70.3/205 = 34.4 percent recovery) of light yellow crystals having a melting point of from 178° to 180°C.

Part D — Another portion of the crude reaction product from the bottom of the reactor was sublimed yielding 87 grams of a slightly off-white product. This material was recrystallized in 48 milliliters of hot absolute ethanol, yielding 53.5 grams of white crystals having a melting point of from 174° to 177°C. These crystals were recrystallized from 46 grams of hot 95 per cent ethanol, yielding 42.8 grams (42.8/87 = 49.2 percent recovery) of white crystals having a melting point of from 178° to 180°C.

Although the crystal color did not affect the melting points of the final purified fractions, Parts A, B, and D were combined while Part C was kept separate due to its yellow color. The reaction went to about 80 per cent completion with the final purified product amounting to 33.6 per cent of the theoretical yield based upon succinimide.

EXAMPLE II

A reactor was set up which consisted of a 100-milliliter, 3-necked flask equipped with a magnetic stirrer, thermometer, and two dropping funnels. A solution of 2,3-dichloromaleimide (3.3 grams, .02 mole) in 25 milliliters of benzene was added to the flask. From the dropping funnels 2.8 grams (0.02$^+$ mole) of isopropylthiolchloroformate, prepared by the method described in Example IV of U.S. Pat. No. 3,093,537, in 10 milliliters of benzene and 2.0 grams (0.02 mole) of triethylamine in 5 milliliters of benzene were added simultaneously over 15 minutes with the temperature being maintained at less than 25°C. by an ice bath.

The reaction mixture was maintained at room temperature over night and suction filtered to remove amine hydrochloride. The filtrate was evaporated to dryness and the brown residue recrystallized from a mixture of ether and hexane. There resulted 3.9 grams (72.6 percent yield) of 2,3-dichloro-N-isopropylthiocarboxy maleimide:

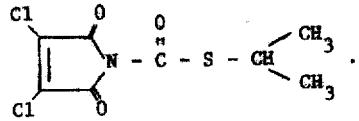

The product consisted of tan crystals having a melting point of 87° to 90°C.

Elemental analysis of the product provided the following results:

| Calculated for $C_8H_7Cl_2NO_3S$ | C 35.82% | H 2.61% | N 5.22% |
|---|---|---|---|
| Found Run 1 | 35.95 | 2.68 | 5.07 |
| Run 2 | 35.95 | 2.53 | 5.08 |
| Average | 35.95 | 2.61 | 5.08 |

The compounds of the present invention possess postemergent herbicidal activity. Weeds may be killed by bringing a phytocidal amount of the compound being employed and the weeds into mutual contact, as for example, by applying the formulated maleimide directly to the weeds. In addition to herbicidal activity, many of the maleimides of the present invention are effective viricides and are especially effective against the tobacco mosaic virus.

In application, formulations containing from about 0.05 to about 90 per cent by weight of the maleimide are applied to the plants being treated. Typical formulations contain from about 25 to about 75 per cent and formulations containing from about 25 to 50 per cent are preferred.

The type of formulation may vary. Solutions and suspensions of the maleimide are effective. The usual method of applying solutions or suspensions of the compound being used is to drench the area of application. Sprays, showers, mists, and dips may be used for this purpose.

Typical solvents which may be employed to prepare maleimide formulations for application include naphtha, toluene, xylene, and isopheron. In one method of application, the maleimide being employed is dissolved in the carrier at a level of 2 to 6 and typically 3 to 4 pounds per gallon. Suspending agents are employed when needed. This solution is then combined with about 50 gallons of water to form an emulsion of the dissolved maleimide in water which is applied to the plants being treated by the methods set out above.

The maleimide may also be applied to the area to be treated in the form of granules. Granular formulations are prepared by dissolving the maleimide in a high boiling petroleum solvent such as Hans Solvent (a heavy aromatic naphtha) or a xylene and spraying the resulting solution through a nozzle manifold mounted in a tumbler blender onto presized granules typically composed of attapulgite or bentonite. The concentration of toxicant will normally range from 1 per cent to 30 per cent, typically from 5 to 20 per cent, by weight of the formulation with the solvent accounting for from 2 per cent to 20 per cent, and typically from 5 to 10 per cent, by weight of the formulation. The granules, whose particle size will normally be 15/30 and preferably 24/48 on the U.S. Standard Sieve Series, are applied directly to the area to be treated such as by use of a broadcast spreader.

An alternative manner of applying the compositions of the instant invention to the area to be treated is in the form of a wettable powder. The powders are prepared by mixing the maleimide with a diluent such as a clay, e.g., talc, kalonite, or a pyrophylite, or a synthetic silica such as Hi-Sil 233 marketed by PPG Industries, Inc. Normally the toxicant will account for 25 to 80 per cent by weight and typically 50 to 75 per cent of the formulation. The resulting mixture is ground, typically in a hammer mill, to yield a product of which 99 per cent or more has a particle size of −200 mesh. The particulate formulation is normally combined with up to 5 weight per cent of each of a dispersing agent such as Polyfon F (a sodium lignosulfonate marketed by West Vaco) and a wetting agent such as Igepon T-77 (sodium-N-methyl-N-oleoyltaurate marketed by GAF). The resulting powder is applied to the area to be treated by dispersing it in water to provide a suspension ranging from 0.5 to 5 per cent by weight of toxicant. The suspension is then applied to the area to be treated such as by spraying.

In general, the formulation is applied so as to provide 1 to 100 pounds of the maleimide per acre with an application level of 1 to 15 pounds per acre being typical and a level of 2 to 12 pounds per acre being preferred.

EXAMPLE III

Appropriate weed species were seeded by growth-time requirement schedules in individual, disposable, 3-inch square containers containing about 2 inches of soil and maintained under greenhouse conditions. When all the weeds had reached suitable growth development (generally first-true leaf stage) plants appropriate to pertaining test requirements were selected for uniformity of growth and development. One container of each weed, averaging up to 50 plants per individual container, was then placed on a carrying tray for treatment.

The compound being tested, i.e., 2,3-dichloro-N-isopropyl-thiocarboxy maleimide, was formulated in a solvent mixture of 90 percent acetone, 8 percent methanol, and 2 percent dimethylformamide by volume.

The carrying trays of containers were placed on a conveyer belt having a linear speed of 1.5 miles per hour. Each tray, as it was carried by the conveyer belt, tripped a microswitch which, in turn, activated a solenoid valve and released the formulated composition in a spray equivalent to 10 pounds of 2,3-dichloro-N-isopropylthiocarboxy maleimide per acre. The containers were then removed to the greenhouse and held for observation. The treated plants were observed daily for interim response with final observations being made about 14 days after treatment.

Each result is reported as an injury rating which is represented as follows: 0 — no visible effect; 1, 2, 3 — slight injury, plant usually recovered with little or no reduction in top growth; 4, 5, 6 — moderate injury, plants usually recovered but with reduced top growth; 7, 8, 9 — severe injury, plants usually did not recover; 10 — all plants killed.

Test results for various weeds are set out in Table 1:

Table 1

| Test Plant | Postemergent Herbicidal Activity 10 pounds per acre |
|---|---|
| Yellow Nutsedge (*Cyperus esculentus*, L.) | 0 |
| Wild Oats (*Avena fatua*, L.) | 7 |
| Jimsonweed (*Datura stramonium*, L.) | 10 |
| Velvetleaf (*Abutilon theophrasti*, Medic.) | 10 |
| Johnsongrass (*Sorghum halepense*, Pers.) | 1 |
| Mustard (*Brassica kaber*, L. C. Wheeler, var. Pinnatifida*, L. C. Wheeler) | 1 |
| Yellow Foxtail (*Setaria glauca*, Beauv.) | 4 |
| Barnyardgrass (*Echinochloa crusgalli*, Beauv.) | 2 |
| Red Kidney Bean (*Phaseolus vulgaris*, L.) | 10 |
| Buckwheat (*Polygonum convolvulus*, L.) | 10 |
| Morning Glory (mixture of *Ipomoea purpurea* Roth and *Ipomoea hederacea* Jacq.) | 8 |
| Untreated Controls | Normal |

EXAMPLE IV

Bean plants, *Phaseolus vulgaris*, grown from seeds under greenhouse conditions and in their true leaf stage were used as test plants in order to determine the viricidal activity of 2,3-dichloro-N-isopropylthiocarboxy maleimide.

The maleimide being tested was dissolved in a solvent composition comprised of 4 milliliters sorbitan trioleate (Span 85), 1 milliliter of a polyoxyalkylene derivative of sorbitan monooleate (Tween 80), and 1995 milliliters of acetone. After dissolving the test compound in the solvent at the desired concentration, the solution was applied to the test plants with a spraying device having a pressurized valve control at 40 pounds pressure for 60 seconds, thereby assuring complete coverage of the plant surface. After the treated plants had air dried, they were inoculated by spraying with extract from tobacco mosaic virus infected leaves and carborundum. The carborundum, which was kept in suspension by constant agitation of the solution, caused the surface tissue of the plant to rupture with gentle rubbing and thus provided sites for the virus to attack the leaves.

Untreated plants and plants inoculated as above were used as controls. Disease severity was determined by actual count of infection loci on inoculated plants. Control effectiveness of the compound is expressed as per cent virus control and is determined by a count of infection loci on treated plants compared with equivalent counts of infection loci on inoculated but otherwise untreated controls. Each reported result is the average of three replicate tests.

An initial evaluation at 1000 ppm gave 95 per cent control. A subsequent retest was undertaken at 1,000, 500, and 250 ppm with 63 per cent, 26 per cent, and 41 per cent control resulting. A retest on tobacco plants, *Nicotiana glutinosa*, at 500, 250, and 100 ppm gave 26 per cent, 0 per cent, and 0 per cent control.

I claim:

1. A halogenated N-substituted thiocarboxy maleimide represented by the formula:

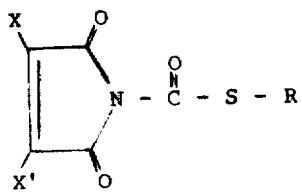

where X is halogen; X' is halogen or H; and R is alkyl, alkenyl, cycloalkyl, cycloalkenyl, haloalkyl, haloalkenyl, phenyl, alkyl phenyl, alkoxyphenyl or halophenyl containing 12 carbon atoms or less.

2. The compounds of claim 1 where R is an alkyl or alkenyl group containing from 1 to 6 carbon atoms.

3. The compounds of claim 1 wherein R is methyl, 2-chloroethyl, isopropyl, 2,3-dibromo butyl, or 2-chloro-3-hexenyl.

4. 2,3-dichloro-N-isopropylthiocarboxy maleimide.

5. A method of preparing 2-halo and 2,3-dihalo-N-substituted thiocarboxy maleimides of the formula:

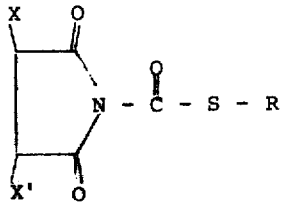

where X is halogen; X' is halogen or H; and R is alkyl, alkenyl, cycloalkyl, cycloalkenyl, haloalkyl, haloalkenyl, phenyl, alkyl phenyl, alkoxyphenyl or halophenyl containing 12 carbon atoms or less, which comprises reacting a halogenated maleimide of the formula:

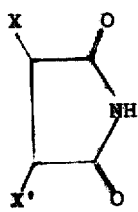

where X and X' are as defined as above with a chlorothioformate of the formula

where R is defined as above, in an inert solvent and in the presence of an acid acceptor.

* * * * *